United States Patent
Eum

(10) Patent No.: US 8,446,598 B2
(45) Date of Patent: May 21, 2013

(54) IMAGE FORMING DEVICE WITH A UWB COMMUNICATION FUNCTION FOR TRANSMITTING SEARCH SIGNAL CORRESPONDING TO TYPE OF DATA RECEIVED, AND METHOD FOR PROVIDING DATA THEREOF, AND SYSTEM FOR PROVIDING DATA USING THE UWB COMMUNICATION FUNCTION

(75) Inventor: Ju-Ho Eum, Anyang-si (KR)

(73) Assignee: Samsung Electronics Co., Ltd., Seoul (KR)

( * ) Notice: Subject to any disclaimer, the term of this patent is extended or adjusted under 35 U.S.C. 154(b) by 996 days.

(21) Appl. No.: 11/540,600

(22) Filed: Oct. 2, 2006

(65) Prior Publication Data

US 2007/0109579 A1 May 17, 2007

(30) Foreign Application Priority Data

Nov. 11, 2005 (KR) ........................ 10-2005-0108136

(51) Int. Cl.
G06F 3/12 (2006.01)

(52) U.S. Cl.
USPC .......................................... 358/1.13; 358/1.15

(58) Field of Classification Search
USPC .............................................. 358/1.13, 1.15
See application file for complete search history.

(56) References Cited

U.S. PATENT DOCUMENTS

| | | | | |
|---|---|---|---|---|
| 7,528,974 B2 * | 5/2009 | Gecht et al. | ................. | 358/1.15 |
| 7,599,077 B2 * | 10/2009 | Hotokeishi | ................. | 358/1.13 |
| 7,649,643 B2 * | 1/2010 | Salgado | ................. | 358/1.15 |
| 2002/0097433 A1 * | 7/2002 | Chang et al. | ................. | 358/1.15 |
| 2003/0123100 A1 * | 7/2003 | Tanimoto | ................. | 358/402 |
| 2004/0049578 A1 * | 3/2004 | Ohara | ................. | 709/224 |
| 2004/0136023 A1 * | 7/2004 | Sato | ................. | 358/1.13 |
| 2005/0024672 A1 * | 2/2005 | Guster et al. | ................. | 358/1.14 |
| 2005/0111633 A1 * | 5/2005 | Osborne | ................. | 379/88.22 |
| 2005/0157329 A1 * | 7/2005 | Park et al. | ................. | 358/1.15 |
| 2005/0270569 A1 * | 12/2005 | Hayashi | ................. | 358/1.15 |
| 2010/0165402 A1 * | 7/2010 | Karaoguz et al. | ................. | 358/1.15 |

FOREIGN PATENT DOCUMENTS

| | | |
|---|---|---|
| CN | 1652536 A | 8/2005 |
| JP | 2001-117829 | 4/2001 |
| KR | 1998-059929 | 10/1998 |
| KR | 2003-077681 | 10/2003 |
| KR | 2004-0070506 | 8/2004 |
| WO | WO 2004009361 A1 * | 1/2004 |

* cited by examiner

*Primary Examiner* — Qian Yang
(74) *Attorney, Agent, or Firm* — Roylance, Abrams, Berdo & Goodman, L.L.P.

(57) ABSTRACT

An image forming device having an ultra wide band (UWB) communication function and a method for providing data thereof, and a system for providing data using UWB communication function are disclosed. The image forming device having a UWB communication function include: a communication network interfacing unit for receiving data through a communication network, a data processing unit for analyzing received data type and converting the data into a certain form, a UWB interfacing unit for transmitting a search signal to a plurality of devices connected through a UWB network, and receiving an answer signal from available devices of the plurality of devices, and a controlling unit for controlling the data processing unit to convert the received data into a form reproducible at the devices transmitting the answer signal, and controlling the UWB interfacing unit to transmit the converted data to the available devices.

26 Claims, 3 Drawing Sheets

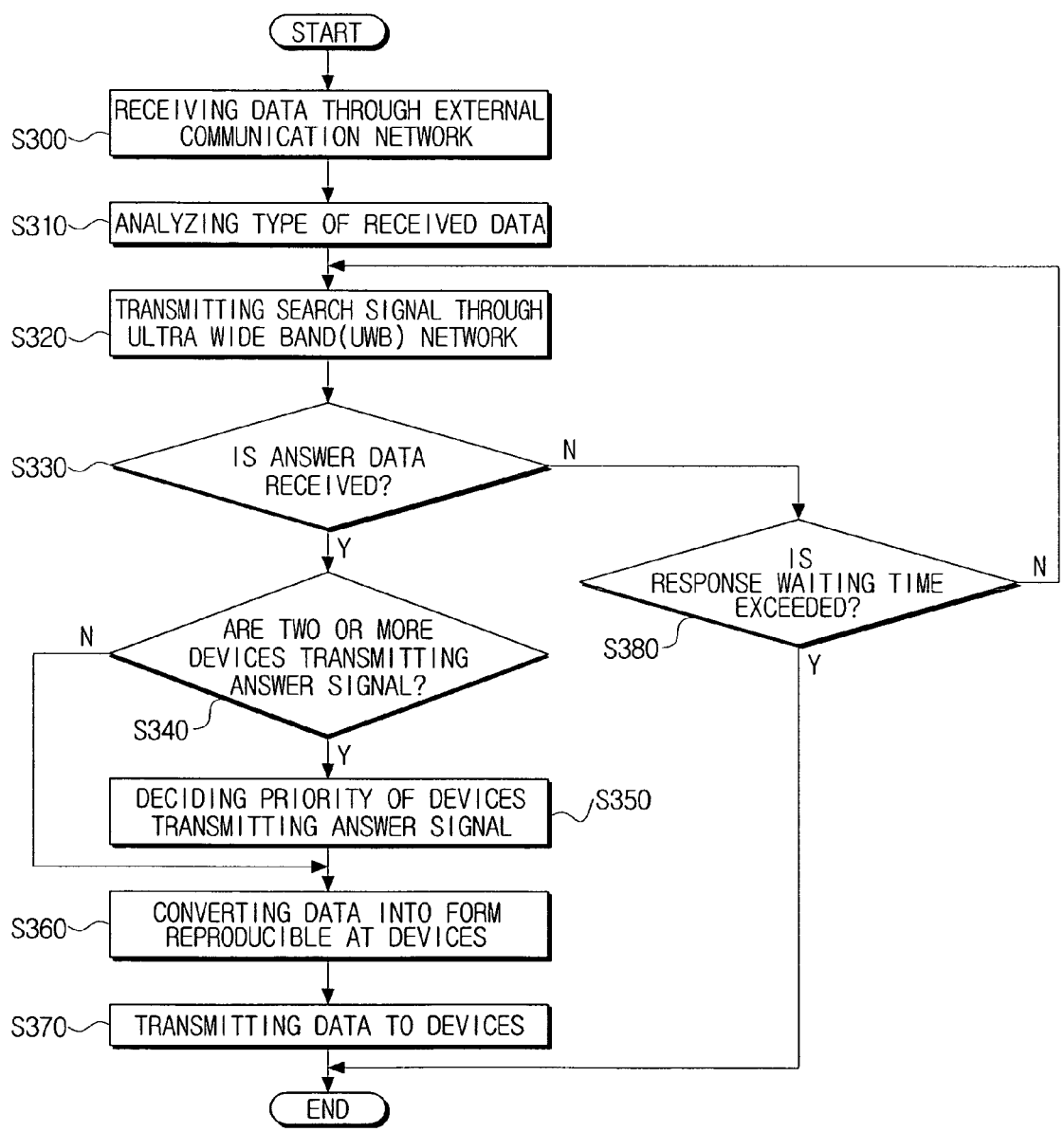

IMAGE FORMING DEVICE WITH A UWB COMMUNICATION FUNCTION FOR TRANSMITTING SEARCH SIGNAL CORRESPONDING TO TYPE OF DATA RECEIVED, AND METHOD FOR PROVIDING DATA THEREOF, AND SYSTEM FOR PROVIDING DATA USING THE UWB COMMUNICATION FUNCTION

PRIORITY

This application claims benefit under 35 U.S.C. §119(a) of Korean Patent Application No. 2005-108136, filed Nov. 11, 2005, in the Korean Intellectual Property Office, the entire contents of which are hereby incorporated by reference.

BACKGROUND OF THE INVENTION

1. Field of the Invention

The present invention relates to an image forming device having an ultra wide band (UWB) communication function. More particularly, the present invention relates to an image forming device having an ultra wide band (UWB) communication function, a method for providing data thereof, and a system for providing data using the UWB communication function, wherein a user can confirm data received by an image forming device through an available device.

2. Description of the Related Art

Increases in office automation have called for various input and output devices, such as a laser beam printer, an LED Print Head (LPH) printer, a duplicator and a facsimile machine. Such devices are commonly referred to as image forming devices.

Existing image forming devices provide individual functions, such as printing or duplicating, in an independent manner within one device. Newer image forming devices integrate various functions into one device, and are referred to as Multi Function Printers (MFP).

It is possible to transmit and receive fax data, email and a file by using one image forming device by having an image forming device provided with a communication module connectable with a communication network. In most cases, a transmitter transmits data without recognizing the current state of a recipient when transmitting various data. Accordingly, the recipient may fail to recognize reception of the data, though data is transmitted from the transmitter's image forming device to the recipient's image forming device.

Conventionally, it is regarded that data transmission and reception are not performed until the recipient checks the image forming device to verify that data is received by the recipient's image forming device.

SUMMARY OF THE INVENTION

Exemplary embodiments of the present invention address at least the above problems and disadvantages and provide at least the advantages described below. Accordingly, an aspect of exemplary embodiments of the present invention provide an image forming device having an ultra wide band (UWB) communication function, a method for providing data thereof, and a system for providing data using the UWB communication function, where an image forming device converts data into a form reproducible at a device connected through a UWB network and transmits the converted data so that a user can immediately check the received data.

According to exemplary embodiments of the present invention, an image forming device is provided having a ultra wide band (UWB) communication function. The device comprises a communication network interfacing unit for receiving data through a communication network, a data processing unit for analyzing the received data by type and converting the data into a certain form, and a UWB interfacing unit for transmitting a search signal to a plurality of devices connected through a UWB network, and receiving an answer signal from available devices among the plurality of devices. The device further comprises a controlling unit for controlling the data processing unit to convert the received data into a form reproducible at the devices transmitting the answer signal, and the UWB interfacing unit to transmit the converted data to the available devices.

The data includes fax data, email and telephone message.

The data processing unit converts the data into at least one of video data and voice data.

When one or more devices transmit an answer signal, the controlling unit decides priority thereof, and controls the data processing unit to convert the data into a form reproducible at the highest priority device.

If the search signal is transmitted through the UWB interfacing unit and the answer signal is not received from the plurality of devices, the controlling unit controls the UWB interfacing unit to re-transmit the search signal.

If the search signal is transmitted through the UWB interfacing unit and a response waiting time is exceeded, the controlling unit concludes communication with the plurality of devices through the UWB interfacing unit.

According to exemplary embodiments of the present invention, a method is provided for providing data of an image forming device having a ultra wide band (UWB) communication function. The method comprises analyzing a type of a received data if the data is received through a communication network, transmitting a search signal to a plurality of devices connected through a UWB network, and receiving an answer signal from available devices among the plurality of devices, converting the received data into a form reproducible at the device transmitting the answer signal, and transmitting the converted data to the available devices.

The data includes fax data, email and telephone messages.

A data processing unit converts the data into at least one of video data and voice data.

Exemplary implementations of the method for providing data of an image forming device having a ultra wide band (UWB) communication function further include deciding priority of the devices transmitting the answer signal when two or more devices transmit the answer signal, and in the operation of converting the form of the data, the data is converted into a form reproducible at the decided device of high priority.

Exemplary implementations of the method for providing data of an image forming device having a UWB communication function further include re-transmitting the search signal if the answer signal is not received from the plurality of devices after the search signal is transmitted.

Exemplary implementations of the method for providing data of an image forming device having a UWB communication function further include concluding communication with the plurality of devices if a response waiting time is exceeded after the search signal is transmitted.

According to exemplary embodiments of the present invention, a system is provided for providing data using ultra wide band (UWB) communication function. The system comprises a plurality of devices connectable through a UWB network, and an image forming device for analyzing a received data type if the data is received through a communication network, transmitting a predetermined search signal to the plurality of devices, and converting the received data into a form reproducible at a device answering to the search signal among the plurality of devices and transmitting the converted data.

The data may include fax data, email and telephone messages.

The data can be converted into at least one of video data and voice data.

BRIEF DESCRIPTION OF THE DRAWING FIGURES

The above and other exemplary features and advantages of the present invention will become more apparent from the following detailed description of certain exemplary embodiments thereof when taken in conjunction with the accompanying drawings, in which:

FIG. 3 shows a flowchart of a method for providing data of the image forming device having a UWB communication function according to an exemplary embodiment of the present invention.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
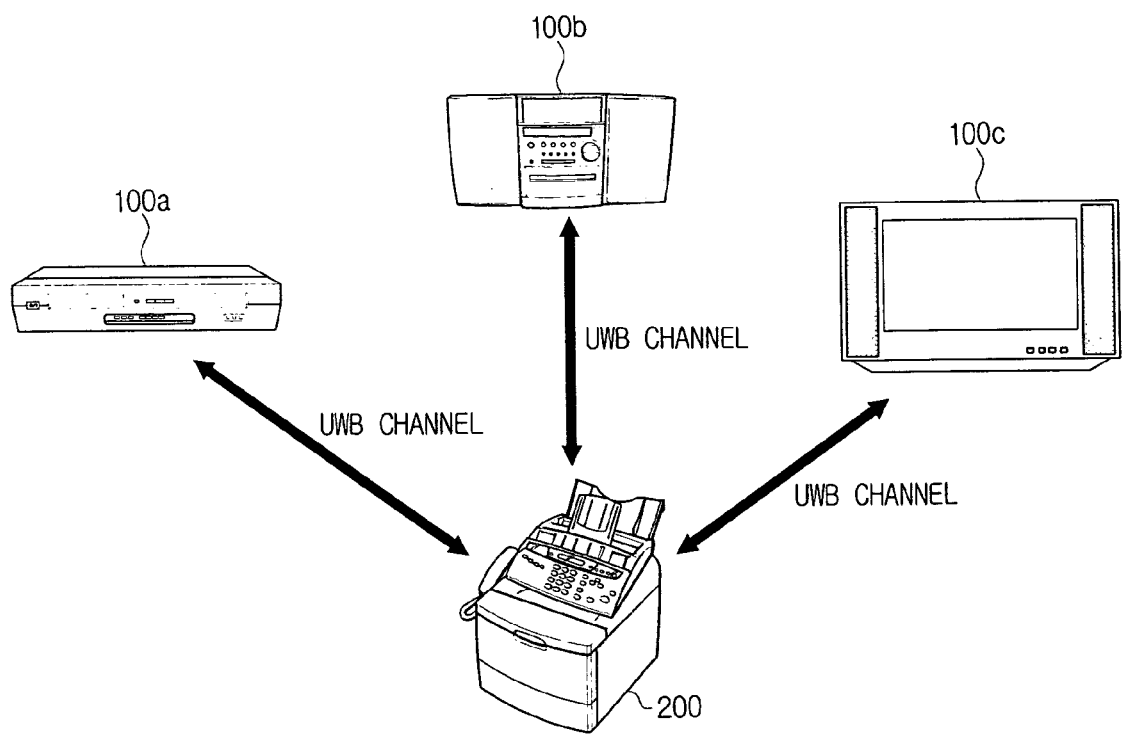
FIG. 1 is a schematic diagram of a system for providing data using ultra wide band (UWB) communication function according to an exemplary embodiment of the present invention.

FIG. 1 is a schematic diagram of a system for providing data using an ultra wide band (UWB) communication function according to an exemplary embodiment of the present invention.

Referring to FIG. 1, the system for providing data using the UWB communication function includes a plurality of devices 100a, 100b and 100c, and an image forming device 200.

The plurality of devices 100a, 100b and 100c are communicable through a UWB network, and capable of transmitting and receiving of data with the image forming device 200 through the UWB network. The plurality of devices 100a, 100b and 100c can comprise a stereo and a television, which can provide a user with image data and voice data. The data can comprise fax data, email and telephone messages.

Known as a wireless digital pulse, the UWB is a wireless technology for transmitting large digital data through wide spectrum frequency at low voltage and a short-distance. Advantageously, a super wide band wireless installation transmits high capacity data as far as 70 meters at low power of 0.5 mW, and passes through an obstacle reflecting a signal and transmitting the signal, at a limited bandwidth at high voltage.

When a search signal is transmitted through the UWB network from the image forming device 200, the plurality of devices 100a, 100b and 100c transmit an answer signal with respect to the search signal to the image forming device 200 through the UWB network.

The image forming device 200 is a Multi Function Printer (MFP) provided with a communication module for receiving fax data and a communication module for receiving an email. When data such as fax data, email and telephone messages are received, the image forming device 200 analyzes the received data type and transmits a certain search signal to the plurality of devices 100a, 100b and 100c.

The image forming device 200 converts the data into a form reproducible at a device answering to the search signal among the plurality of devices 100a, 100b and 100c.

Figure 2:
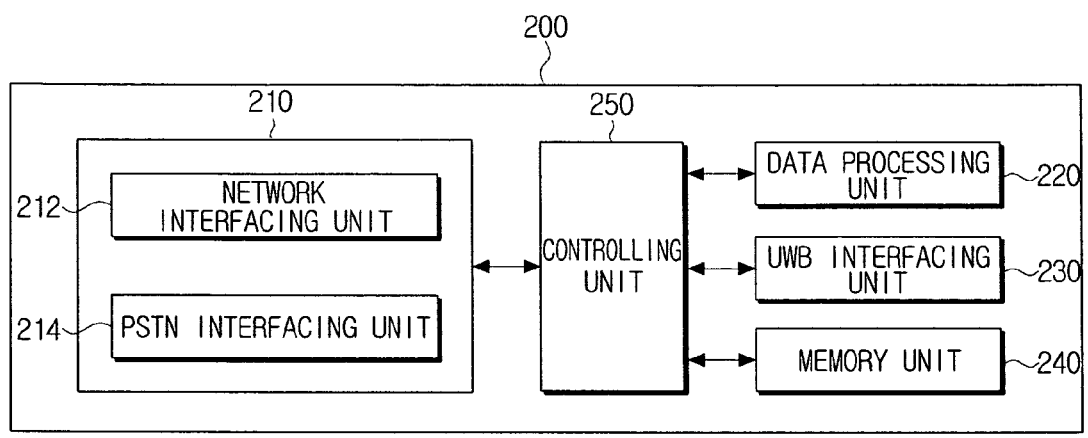
FIG. 2 is a block diagram of an image forming device having a UWB communication function according to an exemplary embodiment of the present invention.

FIG. 2 is a block diagram of an image forming device having a UWB communication function according to an exemplary embodiment of the present invention.

Referring to FIG. 2, an image forming device 200 having a UWB communication function includes a communication network interfacing unit 210, a data processing unit 220, a UWB interfacing unit 230, a memory unit 240 and a controlling unit 250.

The communication network interfacing unit 210 receives data through a communication network. The communication network interfacing unit 210 includes a network interfacing unit 212 and a public switched telephone network (PSTN) interfacing unit 214.

The network interfacing unit 212 supports interface between the image forming device 200 and a communication network such as Internet. The network interfacing unit 212 may receive email from other image forming devices that are connected to the network.

The PSTN interfacing unit 214 supports interface between a PSTN network and the image forming device 200. A PSTN is a worldwide voice-oriented public phone network group. The image forming device 200 may receive fax data and telephone messages from other image forming devices through the PSTN interfacing unit 214.

The data processing unit 220 analyzes the data type received through the communication network interfacing unit 210, that is, the network interfacing unit 212 and the PSTN interfacing unit 214. The data processing unit 220 converts the data into a certain form under control of the controlling unit 250.

The form of data converted by the data processing unit 220 can comprise at least one of voice data and image data. For example, when a corresponding device is a stereo, the data is converted into voice data, and when the corresponding device is a television, the data is converted into one of voice data and image data, or both data forms.

The UWB interfacing unit 230 supports interface between a UWB network and the image forming device 200. The UWB interfacing unit 230 transmits a search signal to a plurality of devices 100a, 100b and 100c connected through the UWB network under control of the controlling unit 250.

The search signal transmitted to the plurality of devices 100a, 100b and 100c by the UWB interfacing unit 230 is directed to searching devices connected with the image forming devices 200, and may be configured to search devices by use of middleware such as a universal plug-and-play (UPnP) and Jini HAVi (home audio video interoperability) applied to home network systems.

The memory unit 240 stores a response waiting time for the controlling unit 250 to apply in the event that the answer signal is not received from the plurality of devices 100a, 100b and 100c.

The controlling unit 250 controls overall functions of the image forming unit 200. More particularly, the controlling unit 250 controls signal input and output between the communication network interfacing unit 210, that is, the network interfacing unit 212 and the PSTN interfacing unit 214, the data processing unit 220, the UWB interfacing unit 230, and the memory unit 240.

The controlling unit 250 controls the data processing unit 220 and the data received through the network interfacing unit 212 or the PSTN interfacing unit 214 into a form reproducible at a device transmitting the answer signal among the plurality of devices 100a, 100b and 100c.

When data is converted into a certain form by the data processing unit 220, the controlling unit 250 controls the UWB interfacing unit 230 to transmit the converted data to a currently available device. The currently available device answers the search signal transmission by the image forming device 200. In an exemplary implementation, it is possible to answer only when power is on, thereby making it easy for a user to check data reception.

The controlling unit 250 decides priority of the devices transmitting the answer signal when the two or more answer signals are input through the UWB interfacing unit 230; that is, there are two or more devices transmitting the answer signal. The priority can be preset in consideration of characteristics of the plurality of devices 100a, 100b and 100c.

If the priority of the devices transmitting the answer signal is decided, the controlling unit 250 controls the data processing unit 220 to convert the data in a form reproducible at the highest priority device.

The search signal is transmitted to the plurality of devices 100a, 100b and 100c through the UWB interfacing unit 230, and when an answer signal is not received from the plurality of devices 100a, 100b and 100c, the controlling unit 250 controls the search signal to be re-transmitted through the UWB interfacing unit 230.

The controlling unit 250 counts time duration after transmission of the search signal to the plurality of devices 100a, 100b and 100c through the UWB interfacing unit 230. If the counted time exceeds a response waiting time, the controlling unit 250 concludes communication with the plurality of devices 100a, 100b and 100c through the UWB interfacing unit 230.

FIG. 3 shows a flowchart of a method for providing data of the image forming device having a UWB communication function according to an exemplary embodiment of the present invention.

Referring to FIGS. 1 through 3, the method for providing data of the image forming device 100 having a UWB communication function will be described.

If a networked image forming devices transmits data through an external communication network, the image forming device 100 receives the data through a network interfacing unit 212 or a PSTN interfacing unit 214, step S300.

When data is received, a data processing unit 220 analyzes data type, step S310, and a UWB interfacing unit 230 transmits a search signal to a plurality of devices 100a, 100b and 100c under control of a controlling unit 250, step S320.

The controlling unit 250 then determines whether an answer signal is received from the available devices through the UWB interfacing unit 230, step S330.

If an answer signal is received through the UWB interfacing unit, the controlling unit 250 determines whether two or more devices are transmitting the answer signal, step S340.

If it is determined that two or more devices are transmitting an answer signal, the controlling unit 250 decides priority of the plurality of devices transmitting the answer signal, step S350.

The controlling unit 250 then controls the data processing unit 220 to convert the data into a form reproducible at the device having highest priority, step S360.

The controlling unit 250 then controls the UWB interfacing unit 230 to transmit the converted data to the device having highest priority among the plurality of devices transmitting the answer signal, step S370.

If the device transmitting the answer signal is one in step S340, the controlling unit 250 does not need to decide priority, and controls the data processing unit 220 to convert the data into a form reproducible at the device transmitting the answer signal, step S360.

The controlling unit 250 then controls the UWB interfacing unit 230 to transmit the converted data to the device transmitting the answer signal, step S370.

If an answer signal is not received through the UWB interfacing unit 230 in step S330, the controlling unit 250 counts response waiting time. The controlling unit 250 determines whether the counted response waiting time exceeds a response waiting time, step S380.

If the counted response time exceeds the response waiting time in step S380, the controlling unit 250 concludes communication with the plurality of devices 100a, 100b and 100c through the UWB interfacing unit 230. If the counted response does not exceed the response waiting time in step S380, the controlling unit 250 controls the search signal to be re-transmitted through the UWB interfacing unit 230, step S320. The process is then repeated.

In the above process, the image forming device 200 converts data received through an external communication network into a form reproducible at a currently available device, that is, a device which a user can immediately check reception of data, and then transmit the converted data.

According to exemplary embodiments of the present invention, an image forming device having a ultra wide band (UWB) communication function and a method for providing data thereof, and a system for providing data using the UWB communication function converts data into a form reproducible at a currently available device and transmits the converted data to the corresponding device, a user can immediately recognize data received through an external communication network. High capacity data can then be efficiently transmitted by use of the UWB network.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims and equivalents thereof.

What is claimed is:

1. An image forming device having an ultra wide band (UWB) communication function, the device comprising:
   a communication network interfacing unit for receiving data through a communication network;
   a data processing unit for determining a type of the data received through the communication network interfacing unit and converting the data into a converted form according to one or more answer signals received from at least one available device among a plurality of devices connected to the image forming device;
   a UWB interfacing unit for transmitting a search signal corresponding to the type of data received to the plurality of devices connected through a UWB network, to search for devices connected to the image forming device, and receiving the answer signals from available devices among the plurality of devices; and a controlling unit for analyzing the answer signals, selecting device from the available devices based on the analysis, controlling the data processing unit to convert the received data into a form reproducible at the selected device, and controlling the UWB interfacing unit to transmit the converted data to the selected device;

wherein the received data comprises at least one of fax data, email and telephone messages; and wherein the data processing unit converts the received data into at least one of video data and voice data.

2. The image forming device of claim 1, wherein if the search signal is transmitted through the UWB interfacing unit and the answer signal is not received from the plurality of devices, the controlling unit controls the UWB interfacing unit to re-transmit the search signal.

3. The image forming device of claim 1, wherein if the search signal is transmitted through the UWB interfacing unit and a response waiting time is exceeded, the controlling unit concludes communication with the plurality of devices through the UWB interfacing unit.

4. A method for providing data of an image forming device having an ultra wide band (UWB) communication function, the method comprising:

determining a type of data received through a communication network;

transmitting a search signal corresponding to the type of data received to a plurality of devices connected through a UWB network to search for available devices connected with the image forming device and receiving one or more answer signals from the available devices among the plurality of devices;

analyzing the received answer signals and selecting a device from the available devices based on the analysis;

converting the received data into a form reproducible at the selected device; and transmitting the converted data to the selected device;

wherein the received data comprises at least one of fax data, email and telephone messages; and wherein the converted data comprises at least one of video data and voice data.

5. The method for providing data of claim 4, further comprising: re-transmitting the search signal if the answer signal is not received from the plurality of devices after the search signal is transmitted.

6. The method for providing data of claim 4, further comprising: concluding communication with the plurality of devices if the response waiting time is exceeded after the search signal is transmitted.

7. A system for providing data using an ultra wide band (UWB) communication function, the system comprising:

a plurality of devices connectable through a UWB network; and an image forming device for determining a type of data received through a communication network, transmitting a search signal corresponding to the type of data received to the plurality of devices to search for available devices connected with the image forming device, receiving one or more answer signals from the plurality of devices, analyzing the answer signals, selecting a device from the plurality of devices based on the analysis, and converting the received data into a form reproducible at the selected device and transmitting the converted data to the selected device;

wherein the received data comprises at least one of fax data, email and telephone messages; and wherein the converted data comprises at least one of video data and voice data.

8. An image forming device, comprising:

a UWB interfacing unit, wherein the UWB interfacing unit transmits a search signal corresponding to a type of data received to a plurality of devices connected through a UWB network to search for available devices connected with the image forming device, and receives one or more answer signals through a network from at least one available device from among a plurality of devices connected with the image forming device;

a communication network interfacing unit for receiving and transmitting data through a communication network; and a controlling unit for controlling a data processing unit to convert the received data into a form reproducible at the available devices transmitting an answer signal;

wherein the image forming device converts the received data into a reproducible format; and wherein controlling the data processing unit to convert the received data by the controlling unit comprises converting the received data into a converted form according to the answer signal received from the available devices;

wherein the received data comprises at least one of fax data, email and telephone messages; and wherein the data processing unit converts the received data into a format comprising at least one of voice data and image data.

9. The image forming device of claim 8, wherein the search signal is directed to search for a device in communication with the image forming device.

10. The image forming device of claim 9, wherein the device in communication with the image forming device is searched using middleware comprising universal plug-and-play and Jini Home Audio Video interoperability (HAVi).

11. The image forming device of claim 8, wherein the control unit monitors time elapsed after transmission of a search signal and terminates communication after a response waiting time has occurred.

12. The image forming device of claim 8, wherein the UWB interfacing unit transmits the search signal to a plurality of devices connected through a UWB network under control of the controlling unit.

13. The image forming device of claim 12, wherein the controlling unit selects a device from the plurality of devices based on an analysis of the received signals.

14. The image forming device of claim 13, wherein the controlling unit controls the image forming device to convert data into a format that is reproducible at the device having highest priority.

15. The image forming device of claim 8, wherein the controlling unit determines whether an answer signal is received through the UWB interfacing unit.

16. The image forming device of claim 8, wherein the communication network interfacing unit comprises a network interfacing unit and a public switched telephone network (PSTN) interfacing unit.

17. The image forming device of claim 8, wherein the communication network interfacing unit supports interface between the image forming device and the Internet.

18. The image forming device of claim 8, wherein the controlling unit controls signal input and output between the communication network interfacing unit and the UWB interfacing unit.

19. The image forming device of claim 8, further comprising:
- a UWB interfacing unit, wherein the UWB interfacing unit transmits a search signal and receives an answer signal through a network;
- a controlling unit; and
- a data processing unit for analyzing data type and converting data into a reproducible format.

20. The image forming device of claim 19, wherein the controlling unit controls the UWB interfacing unit to transmit the converted data.

21. The image forming device of claim 20, wherein the controlling unit controls the UWB interfacing unit to transmit the converted data to a device transmitting the answer signal.

22. The image forming device of claim 19, wherein the controlling unit controls signal input and output between the data processing unit and the UWB interfacing unit.

23. The image forming device of claim 19, wherein the data is converted into a format reproducible on an external device comprising a fax machine, video monitor, telephone, and printer.

24. The image forming device of claim 8, wherein the controlling unit controls the UWB interfacing unit to transmit data to a device transmitting the answer signal.

25. The image forming device of claim 8, wherein the controlling unit controls the UWB interface unit to retransmit the search signal when no answer signal is received.

26. The image forming device of claim 8, wherein the controlling unit stores a response waiting time in a memory to apply when no answer signal is received.

* * * * *